United States Patent
Gottschalk et al.

(10) Patent No.: US 7,646,271 B2
(45) Date of Patent: Jan. 12, 2010

(54) ELECTRICAL SWITCHING APPARATUS AND INTERLOCKING PHASE BARRIER THEREFOR

(75) Inventors: Andrew L. Gottschalk, Pittsburgh, PA (US); Frankie K. Ostrowski, Natrona Heights, PA (US); Kelly J. McCarthy, Pittsburgh, PA (US); Paul R. Rakus, Chippewa Township, PA (US)

(73) Assignee: Eaton Corporation, Cleveland, OH (US)

( * ) Notice: Subject to any disclaimer, the term of this patent is extended or adjusted under 35 U.S.C. 154(b) by 26 days.

(21) Appl. No.: 11/691,864

(22) Filed: Mar. 27, 2007

(65) Prior Publication Data

US 2008/0237001 A1 Oct. 2, 2008

(51) Int. Cl.
*H01H 9/02* (2006.01)
*H01H 13/04* (2006.01)

(52) U.S. Cl. .............................. 335/202; 335/8; 335/11; 335/85; 335/102; 335/120; 335/160; 218/155; 218/156; 218/157; 200/50.32

(58) Field of Classification Search ................ 335/8, 335/11, 85, 102, 120, 160, 202; 218/155–157; 200/50.32
See application file for complete search history.

(56) References Cited

U.S. PATENT DOCUMENTS

| | | | |
|---|---|---|---|
| 5,157,584 A | 10/1992 | Rowe | |
| 5,200,585 A | 4/1993 | Davies et al. | |
| 5,910,757 A | 6/1999 | Broghammer et al. | |
| 6,172,585 B1 | 1/2001 | Zindler et al. | |
| 6,924,721 B2 | 8/2005 | Afshari et al. | |
| 2002/0050877 A1* | 5/2002 | Swartzentruber et al. | 335/8 |
| 2004/0065531 A1 | 4/2004 | Richter | |
| 2005/0068131 A1* | 3/2005 | Azzola et al. | 335/202 |
| 2006/0049145 A1* | 3/2006 | Shea et al. | 218/155 |
| 2006/0148288 A1* | 7/2006 | Azzola et al. | 439/138 |
| 2007/0042624 A1* | 2/2007 | Gerving et al. | 439/188 |

* cited by examiner

*Primary Examiner*—Elvin G Enad
*Assistant Examiner*—Mohamad A Musleh
(74) *Attorney, Agent, or Firm*—Martin J. Moran

(57) ABSTRACT

A circuit breaker includes an enclosure with a first side and a second side opposite and distal from the first side. A number of separable contacts are enclosed by the enclosure. An operating mechanism is structured to open and close the separable contacts. A plurality of terminals are electrically interconnected with the number of separable contacts. The terminals protrude through the second side of the enclosure. A number of phase barrier apparatus is disposed on the second side of the enclosure. Each of the number of phase barrier apparatus includes a plurality of separate phase barrier members, each of which is disposed about a corresponding one of the terminals, and a number of interlocking members. Each of the number of interlocking members interlocks with an adjacent pair of the separate phase barrier members.

3 Claims, 6 Drawing Sheets

ELECTRICAL SWITCHING APPARATUS AND INTERLOCKING PHASE BARRIER THEREFOR

BACKGROUND OF THE INVENTION

1. Field of the Invention

The invention relates generally to electrical switching apparatus and, more particularly, to phase barriers for electrical switching apparatus, such as circuit breakers.

2. Background Information

Electrical switching apparatus used in power distribution systems are often mounted within a housing assembly either individually or in combination with other switchgear (e.g., without limitation, circuit switching devices and circuit interrupters such as circuit breakers, contactors, motor starters, motor controllers and other load controllers).

Some electrical switching apparatus, for example, switchgear such as low-voltage circuit breakers, can be relatively large. In order to facilitate movement (e.g., installation; removal; maintenance), a sizeable circuit breaker is commonly coupled to rollers, which permit such circuit breaker to be drawn out of the housing assembly. Accordingly, such circuit breakers are commonly known as "draw-out" circuit breakers.

Power circuit breakers are typically large in size and relatively heavy and are, therefore, often mounted with other switchgear in a cabinet or other enclosure. In order to facilitate insertion and removal of the power circuit breaker with respect to the cabinet, the power circuit breaker is typically mounted within a frame, known as a cassette, which may be drawn into and out of the cabinet. Hence, the "draw-out" designation is commonly associated with this type of power circuit breaker configuration.

Many low-voltage circuit breakers, for example, employ a molded housing having a molded cover and a molded base. The operating mechanism for such circuit breakers is often mounted to the molded cover or front part of the housing, and typically includes an operating handle and/or other suitable user interface. The molded base or rear part typically includes electrical terminals. These electrical terminals sometimes comprise finger clusters, which are structured to be electrically connected, for example, to electrical conductors (e.g., without limitation, fixed stab terminals) of the cabinet. For multi-pole circuit breakers, each pole of the circuit breaker may have its own finger clusters.

It is desirable to electrically insulate the electrical terminals of one pole of the circuit breaker from the electrical terminals of the other circuit breaker poles. To accomplish this objective, one prior proposal employs a phase barrier coupled to the circuit breaker housing proximate the terminals and structured to electrically insulate the terminals from one another. However, known phase barriers consist of a one-piece custom component made to include the necessary number of compartments corresponding to the terminals of the corresponding number of circuit breaker poles. Accordingly, different phase barriers must be made for different circuit breakers having different numbers of poles. Such phase barriers also tend to require a relatively higher number of fasteners than desired to secure the phase barrier to the circuit breaker housing.

There is, therefore, room for improvement in electrical switching apparatus, such as circuit breakers, and in phase barrier apparatus therefor.

SUMMARY OF THE INVENTION

These needs and others are met by embodiments of the invention, which are directed to an interlocking phase barrier apparatus for electrical switching apparatus, such as circuit breakers. The phase barrier apparatus comprises a plurality of separate phase barrier members that are interlocked together with a number of interlocking components, in order to electrically insulate the terminals of a circuit breaker.

As one aspect of the invention, a phase barrier apparatus for an electrical switching apparatus comprises: a plurality of separate phase barrier members; and a number of interlocking members, each of the number of interlocking members interlocking with an adjacent pair of the separate phase barrier members.

Each of the separate phase barrier members may be symmetrical and comprise a first side with a number of slots and an opposite second side with the same number of slots; each of the interlocking members may be symmetrical and comprise a first side with a number of pins and an opposite second side with the same number of pins; and each of the pins may be structured to mate with a corresponding one of the slots.

Each of the separate phase barrier members may comprise a first side with two first slots and a second side with two second slots; each of the interlocking members may comprise a first side with two first pins and a second side with two second pins; the two first pins may be structured to mate with the two first slots of one phase barrier member of the adjacent pair of the separate phase barrier members; and the two second pins may be structured to mate with the two second slots of the other phase barrier member of the adjacent pair of the separate phase barrier members.

Each of the separate phase barrier members may comprise a first side with a number of tapered slots and a second side with a number of tapered slots; each of the interlocking members may comprise a first side with a number of tapered pins and a second side with a number of tapered pins; and each of the tapered pins may be structured to mate with a corresponding one of the tapered slots.

The number of tapered pins may be four tapered pins; each of the four tapered pins may include a taper; each of the number of interlocking members may comprise a body including a first side, a second side opposite and distal from the last such first side, and four edges extending from the last such first side to the last such second side; each of the four tapered pins may define a corresponding one of the four edges; and each of the four edges may include a protrusion proximate the last such first side that forms at least part of the taper of a corresponding one of the four tapered pins.

The number of tapered slots of the first side of such each of the separate phase barrier members may be two tapered slots and the number of tapered slots of the second side of such each of the separate phase barrier members may be two tapered slots; and each of the tapered slots of the last such first and second sides may be resilient and be structured to flex in response to engagement with a corresponding one of the tapered pins.

As another aspect of the invention, an electrical switching apparatus comprises: an enclosure comprising a first side and a second side opposite and distal from the first side; a number of separable contacts enclosed by the enclosure; an operating mechanism structured to open and close the separable contacts; a plurality of terminals electrically interconnected with the number of separable contacts, the terminals protruding through the second side of the enclosure; and a number of phase barrier apparatus disposed on the second side of the enclosure, each of the number of phase barrier apparatus comprising: a plurality of separate phase barrier members, each of the separate phase barrier members being disposed about a corresponding one of the terminals, and a number of interlocking members, each of the number of interlocking members interlocking with an adjacent pair of the separate phase barrier members.

The number of phase barrier apparatus may be a first phase barrier apparatus disposed about a plurality of line terminals and a second phase barrier apparatus disposed about a plurality of load terminals.

The line terminals may be above the load terminals; and the first phase barrier apparatus may be disposed on the second side of the enclosure and be symmetrical to the second phase barrier apparatus as disposed on the second side of the enclosure.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
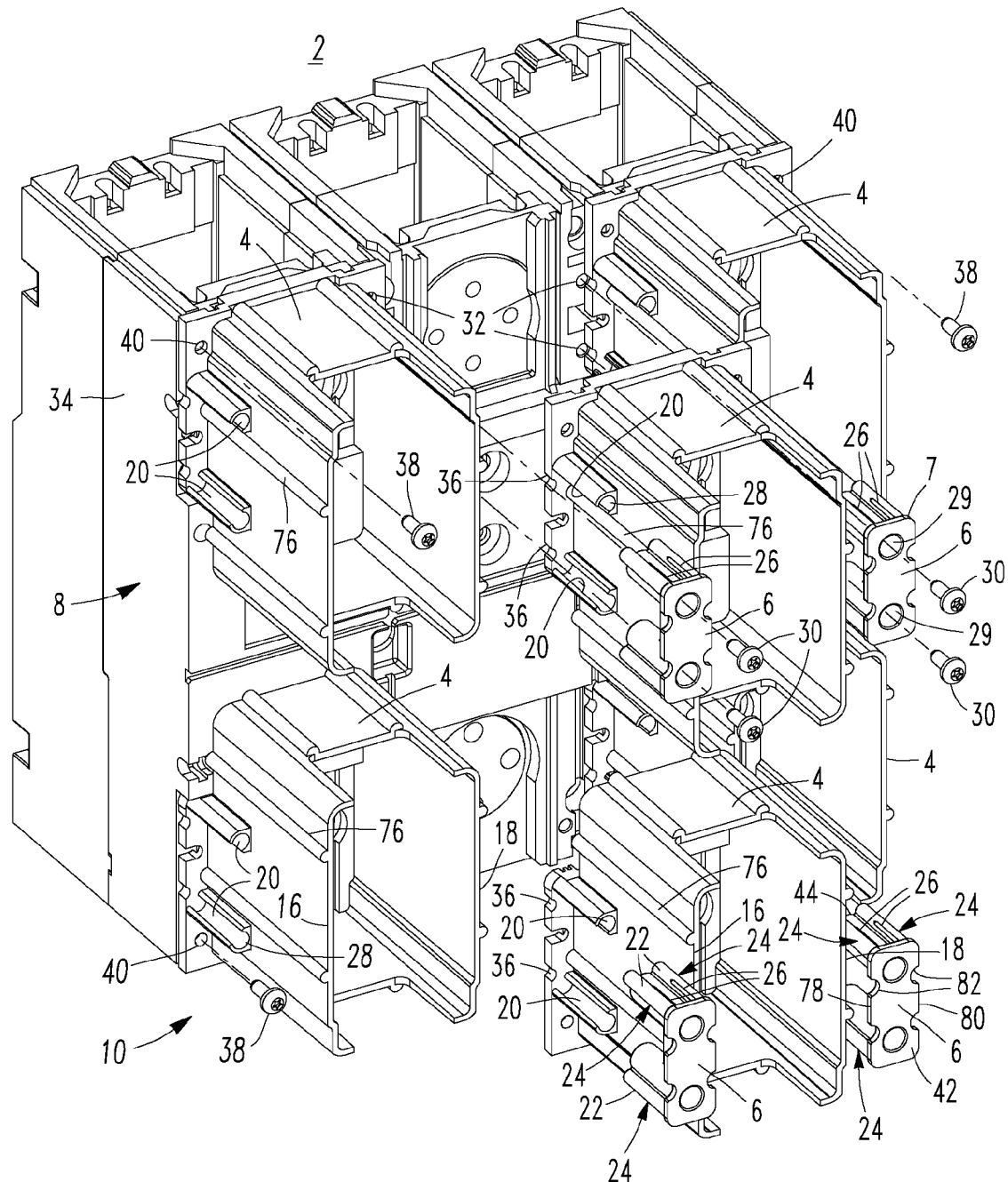
FIG. 1 is a partially exploded isometric view of the rear of a circuit breaker including a plurality of phase barrier members and a plurality of interlocking keys in accordance with embodiments of the invention.

For purposes of illustration, embodiments of the invention will be described as applied to a three-pole circuit breaker, although it will become apparent that they could also be applied to a wide variety of electrical switching apparatus (e.g., without limitation, circuit switching devices and other circuit interrupters, such as contactors, motor starters, motor controllers and other load controllers) having any suitable plurality of poles or any suitable plurality of terminals.

Directional phrases used herein, such as, for example, left, right, top, bottom, upper, lower, front, back and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the term "interlocking" means locking together, uniting, or connecting in order that the position of one part or component is constrained by the position of a number of other parts or components.

As employed herein, the term "separate" means capable of existing by itself.

As employed herein, the statement that two or more parts are "coupled" together shall mean that the parts are joined together either directly or joined through one or more intermediate parts. Further, as employed herein, the statement that two or more parts are "attached" shall mean that the parts are joined together directly.

As employed herein, the term "number" shall mean one or an integer greater than one (i.e., a plurality).

Referring to FIG. 1, the rear of a circuit breaker 2 includes a plurality of separate phase barrier members 4 and a plurality of interlocking components (e.g., interlocking keys or keys 6). As shown, the circuit breaker 2 has two separate phase barrier apparatus 8,10 for the respective upper (with respect to FIG. 1) line terminals 12 (shown in FIG. 4) and the lower (with respect to FIG. 1) load terminals 14 (shown in FIG. 4). Each of the example phase barrier apparatus 8,10 includes three separate phase barrier members 4 and two interlocking keys 6. Each of the interlocking keys 6 interlocks with an adjacent pair of the separate phase barrier members 4, as will be explained. This permits a single mold (not shown) to be used to manufacture the separate phase barrier members 4, which may be pre-assembled into the desired structure (e.g., without limitation, the three-pole phase barrier apparatus 8,10) for a particular circuit breaker, such as circuit breaker 2.

The interlocking key 6 holds together two separate phase barrier members 4. This enables, for example and without limitation, two or three or four identical phase barrier members 4 to be coupled together by one or two or three, respectively, identical interlocking keys 6, in order to be used with a respective two or three or four pole circuit breaker. For example, FIG. 1 shows the three-pole circuit breaker 2.

Figure 3:
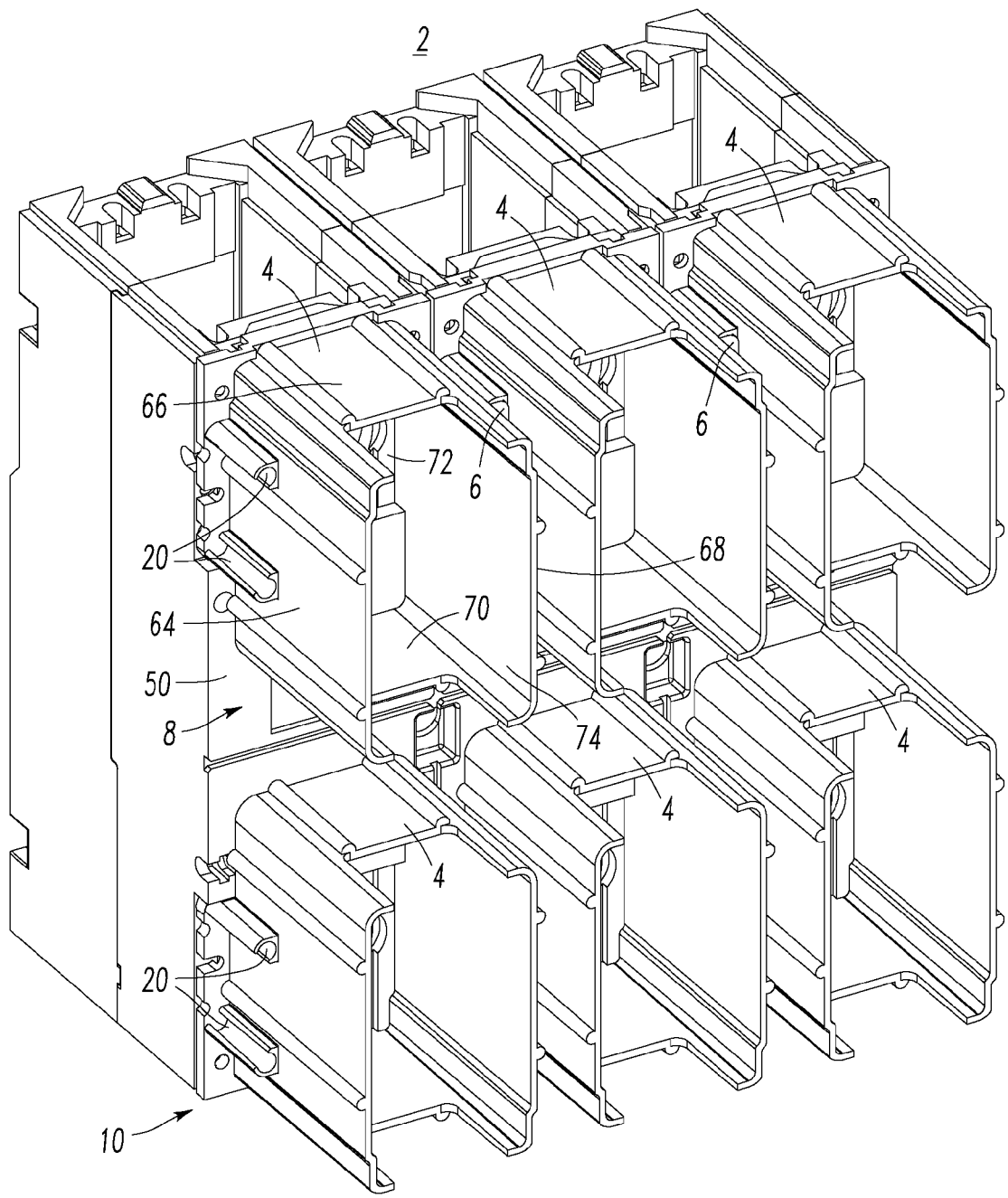
FIG. 3 is an isometric view of the rear of the circuit breaker of FIG. 1 with the phase barrier members and interlocking keys in a fully assembled position.
Figure 4:
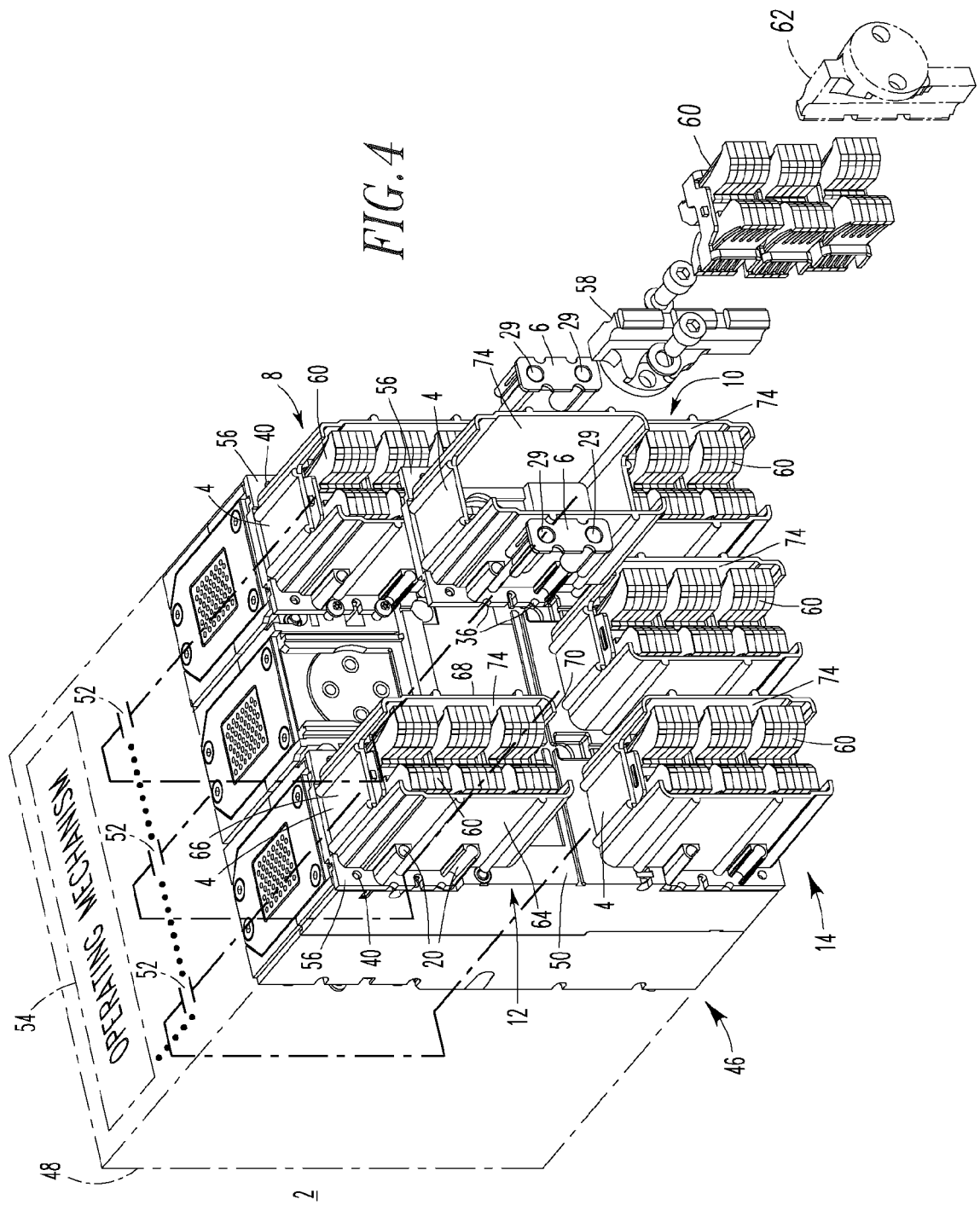
FIG. 4 is a partially exploded isometric view of the rear of the circuit breaker of FIG. 1, but also including a plurality of primary stabs and a plurality of finger clusters in accordance with an embodiment of the invention.
Figure 5:
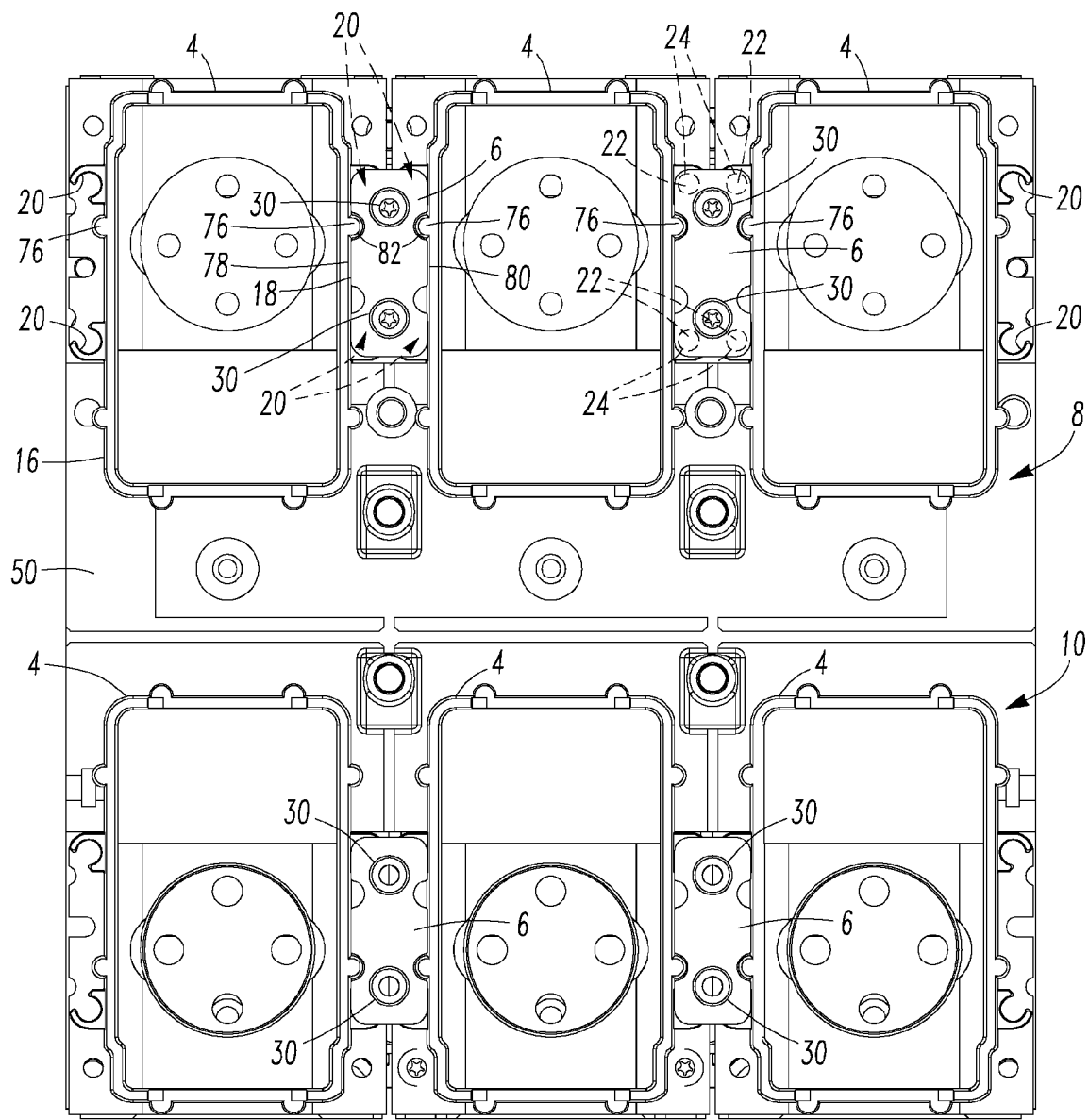
FIG. 5 is a vertical elevation view of the rear of the circuit breaker of FIG. 3.

The phase barrier members 4 are symmetrical and two opposite sides 16,18 thereof have slots 20 (as shown in FIGS. 1-6) to receive pins 22 (three pins 22 are shown in FIG. 1 with one key 6 and four pins 22 are shown in hidden line drawing in FIG. 5 with one key 6) of the interlocking key 6. Each interlocking key 6 is also symmetrical and has four edges 24 (three edges 24 are shown in FIG. 1 with two keys 6 and four edges 24 are shown in hidden line drawing in FIG. 5 with one key 6), each edge 24 with a tapered (e.g., narrower at the top left of FIG. 1 and wider at the bottom right of FIG. 1) pin 22. When the separate phase barrier members 4 are interlocked together as an assembly in the form of the example three-pole phase barrier apparatus 8 or 10, the tapered pins 22 engage the tapered (e.g., narrower at the top left of FIG. 1 and wider at the bottom right of FIG. 1) slots 20 and add structure to such assembly. As shown in FIG. 5, two of the pins 22 (shown in hidden line drawing) of the key 6 mate with two slots 20 (shown in hidden line drawing) of one phase barrier member 4, and the other two pins 22 mate with two slots 20 (shown in hidden line drawing) of the adjacent phase barrier member 4.

The tapered pins 22 have protrusions 26 (two protrusions 26 are shown in FIG. 1), which protrusions engage the tapered slots 20 in the sides 16,18 of the phase barrier members 4. As shown, each of the four tapered pins 22 defines a corresponding one of the four edges 24. The example molded plastic tapered slots 20 are preferably resilient and flex in response to engagement with a corresponding one of the tapered pins 22 when the protrusion 26 thereof is pressed in at the entrance 28 of a corresponding tapered slot 20. The protrusions 26 provide interference with the tapered slots 20 of the phase barrier member 4 when the key 6 is pressed in. This press fit helps to hold the two adjacent phase barrier members 4 to each other. Thus, the tapered pins 22 of the keys 6 and the tapered slots 20 of the phase barrier members 4 help to hold the separate components together to form the example three-pole phase barrier apparatus 8,10.

The interlocking keys 6 include a body 7 having two example openings 29 therethrough. Two screws 30 are employed through the interlocking key openings 29 into corresponding openings 32 in the circuit breaker rear housing 34. Each phase barrier member 4 has clearance slots 36 for the screws 30. The two adjacent phase barrier members 4 are trapped between the key 6 and the rear housing 34. A number of other screws 38 may be employed through openings 40 in, for example, two outside corners of two outside phase barrier members 4 to further secure the ends of the three-pole phase barrier apparatus 8 to the rear housing 34.

The interlocking key body 7 includes a first side 42, a second side 44 opposite and distal from the first side 42, and the four edges 24 extending from the first side 42 to the second side 44. Each of these edges 24 includes a corresponding protrusion 26 proximate the first side 42 that forms at least part of the taper of a corresponding one of the tapered pins 22.

As shown in FIG. 4, the circuit breaker 2 includes an enclosure 46 having a first side 48 and a second side 50 opposite and distal from the first side 46. A number of separable contacts 52 (shown in simplified form in hidden line drawing) are enclosed by the enclosure 46. An operating mechanism 54 (shown in simplified form in hidden line drawing) is structured to open and close the separable contacts 52. The plural terminals 12,14 are electrically interconnected with the separable contacts 52. The line and load terminals 12,14 protrude through the enclosure second side 50. The example three-pole phase barrier apparatus 8,10 are also disposed on the enclosure second side 50. For example, the circuit breaker 2, as shown, is a three-pole circuit breaker and each of the three separable contacts 52 is electrically connected between a corresponding pair of the line and load terminals 12,14. Although a three-pole circuit breaker is shown, the invention is applicable to a circuit breaker having any suitable number of poles.

Figure 2:
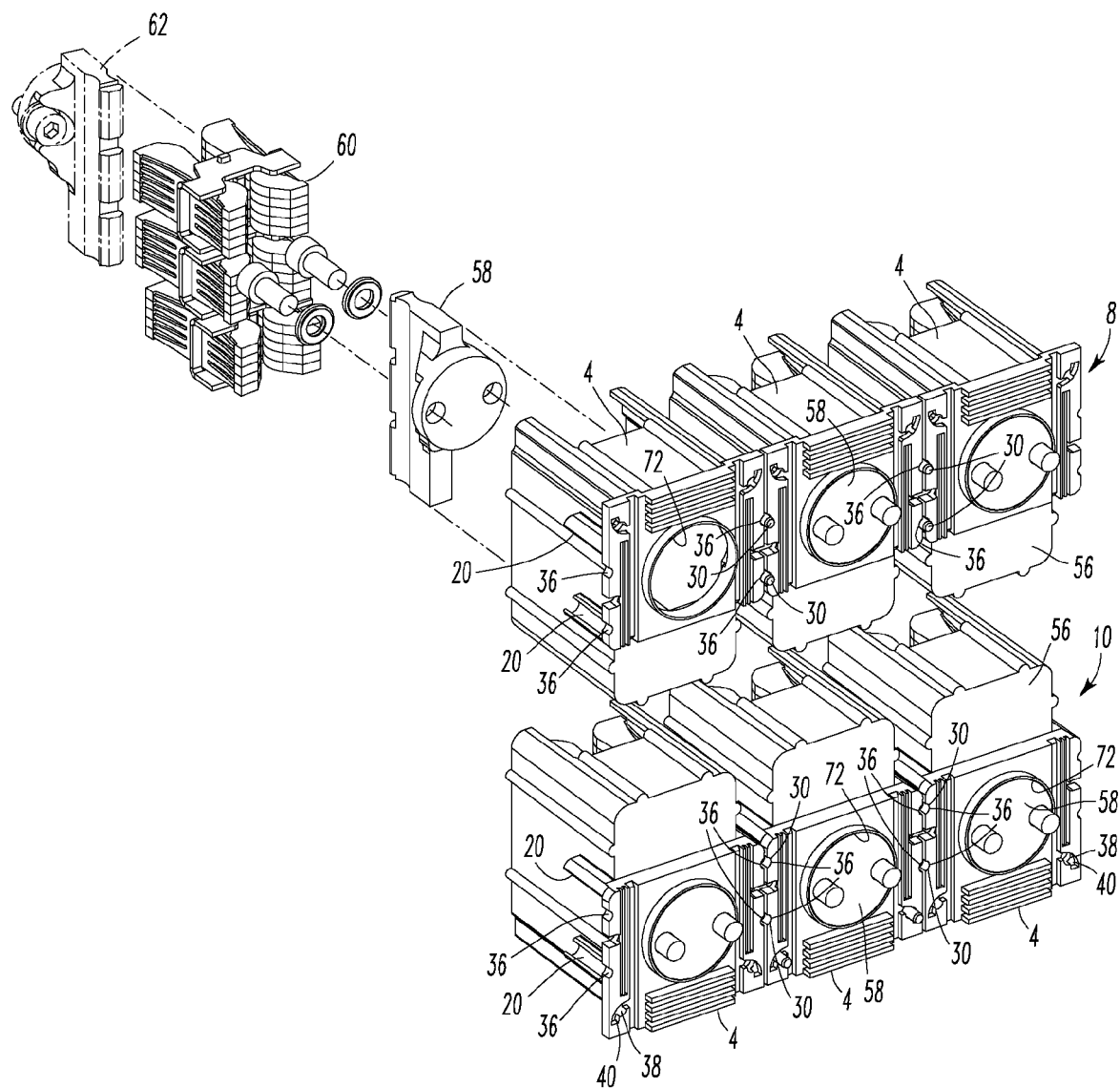
FIG. 2 is a partially exploded isometric view of the rear of a plurality of interlocked phase barrier members including primary stabs and finger clusters in accordance with an embodiment of the invention.

Also referring to FIG. 2, each of the separate phase barrier members 4 includes a base 56 adjacent the enclosure second side 50. For each of the key openings 29 (FIG. 4) for the screws 30 (FIG. 2), the base 56 includes the clearance slot 36 for the corresponding screw. The base 56 also includes the opening 40 for the fastener 38 (FIG. 2) that fastens the base 56 to the enclosure second side 50 (FIG. 4).

Continuing to refer to FIGS. 2 and 4, each of the terminals 12,14 (FIG. 4) includes a primary stab 58 and a finger cluster 60. The primary stab 58 is electrically and mechanically connected to the finger cluster 60 in a well-known manner. A corresponding one of the separate phase barrier members 4 is disposed substantially around the finger cluster 60. The phase barrier members 4 are also employed over corresponding primary stabs 58 of the circuit breaker 2. Inside each of the phase barrier members 4, a corresponding spring loaded finger cluster 60 is electrically and mechanically connected to a corresponding primary stab 58 (e.g., a line stab terminal or a load stab terminal of a corresponding pole) of the circuit breaker 2. The circuit breaker 2, including the phase barrier members 4, the primary stabs 58 and the finger clusters 60, is structured to be cranked into a cabinet (not shown). The cabinet includes a fixed set of stabs 62 (one fixed stab 62 is shown in phantom line drawing), each of which makes electrical and mechanical contact with a corresponding one of the spring loaded finger clusters 60.

FIG. 3 shows the circuit breaker 2 of FIG. 1 including the phase barrier members 4 and interlocking keys 6 in a fully assembled position, but excluding the terminals 12,14 of FIG. 4. The phase barrier members 4 prevent arcing from one primary stab 58 and finger cluster 60 (FIGS. 2 and 4) to an adjacent primary stab 58 and finger cluster 60 during insertion or removal of the circuit breaker 2 to or from the cabinet (not shown), or during an overload condition of the circuit breaker 2.

Figure 6:
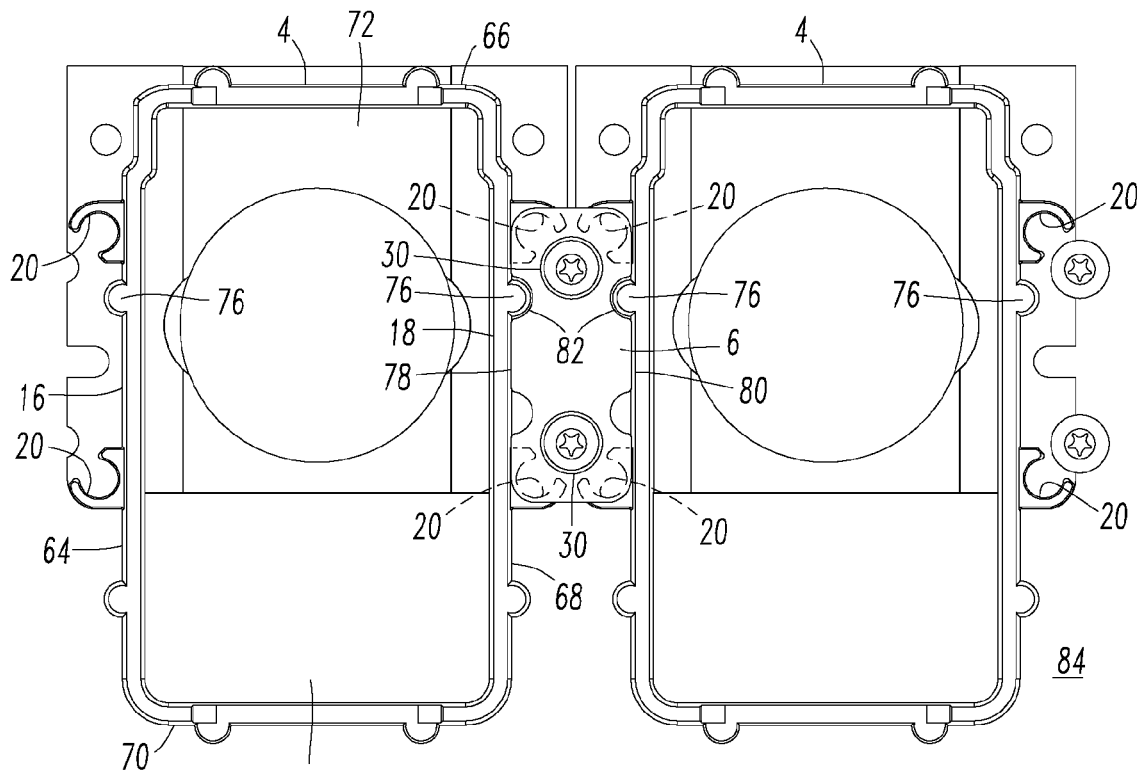
FIG. 6 is a vertical elevation view of two phase barrier members and one interlocking key in accordance with another embodiment of the invention.

As can be seen from FIGS. 3, 4 and 6, each of the separate phase barrier members 4 includes four insulative sides 64,66, 68,70, a first open end 72 (best shown in FIG. 6) and a second open end 74. The first open end 72 is adjacent the enclosure second side 50. As shown in FIG. 2, the primary stab 58 of the terminals 10,12 (FIG. 4) protrudes through the first open end 72 of the phase barrier member 4. As shown in FIG. 4, the finger clusters 60 are accessible through the phase barrier member second open ends 74.

Although FIG. 4 shows that the line terminals 12 are above (with respect to FIG. 4) the load terminals 14 on the enclosure second side 50, it will be appreciated that any suitable orientation of the terminals 12,14 may be employed.

Referring to FIGS. 4 and 5, the first three-pole phase barrier apparatus 8 is disposed about the line terminals 12 (FIG. 4) and the second three-pole phase barrier apparatus 10 is disposed about the load terminals 14 (FIG. 4). As best shown in FIG. 5, the first three-pole phase barrier apparatus 8 is symmetrical with respect to the second three-pole phase barrier apparatus 10 as both are disposed on the enclosure second side 50. These symmetrical apparatus 8,10 correspond to the symmetrical orientation of the line and load terminals 12,14.

As shown in FIGS. 1, 5 and 6, each of the opposing sides 16,18 of the phase barrier members 4 includes the two slots 20 and a runner 76 parallel to the slots 20. Each of the sides 78,80 of the interlocking keys 6 includes the two pins 22 and a recess 82 parallel to the pins 22. The pins 22 mate with the slots 20 and the recesses 82 mate with the runners 76.

FIG. 6 shows two separate, identical phase barrier members 4 and one interlocking key 6 that form another phase barrier apparatus 84. This apparatus 84 may be employed, for example, in a two-pole circuit breaker (not shown) for either two line terminals (not shown) or two load terminals (not shown) thereof. Alternatively, the apparatus 84 may be employed, for example, in a one-pole circuit breaker (not shown) in which one phase barrier member 4 is for the line terminal (not shown) and the other phase barrier member 4 is for the load terminal (not shown).

Figure 7:
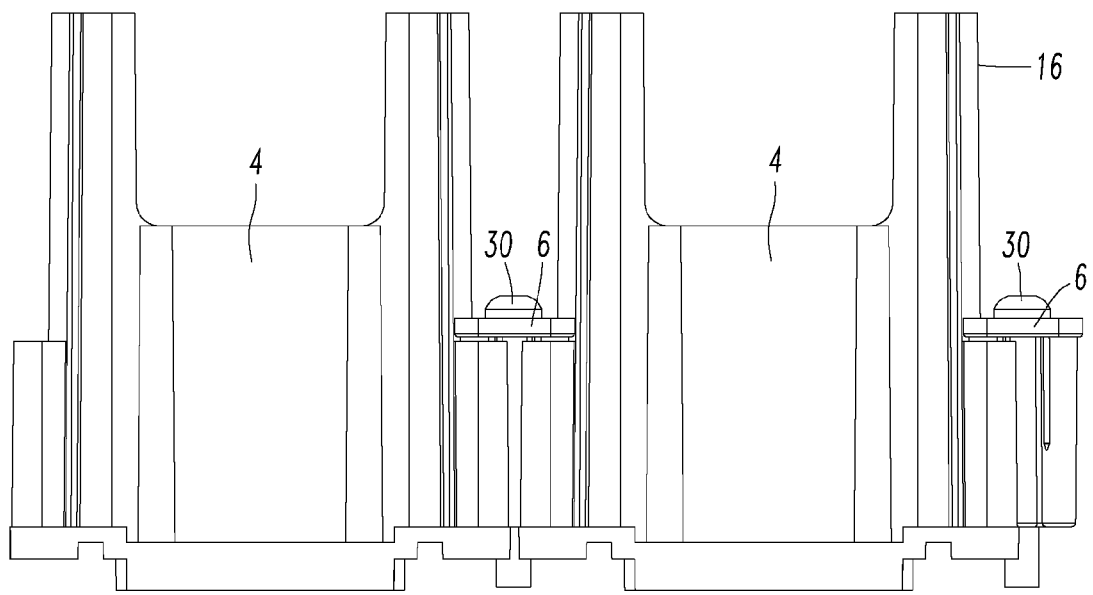
FIG. 7 is a top plan view of two phase barrier members and two interlocking keys in accordance with another embodiment of the invention.

FIG. 7 shows two separate, identical phase barrier members 4 and two identical interlocking keys 6 that form another phase barrier apparatus 86. Here, the second interlocking key 6 (to the right of FIG. 7) may be employed, for example, to interlock with another phase barrier member 4 (not shown).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical switching apparatus comprising:
an enclosure comprising a first side and a second side opposite and distal from said first side;
a number of separable contacts enclosed by said enclosure;
an operating mechanism structured to open and close said separable contacts;
a plurality of terminals electrically interconnected with said number of separable contacts, said terminals protruding through the second side of said enclosure; and
a number of phase barrier apparatus disposed on the second side of said enclosure, each of said number of phase barrier apparatus comprising:
a plurality of separate phase barrier members, each of said separate phase barrier members being disposed about a corresponding one of said terminals,
a number of interlocking members, each of said number of interlocking members interlocking with an adjacent pair of said separate phase barrier members; and
wherein each of said separate phase barrier members comprises four sides, a first open end and a second open end; wherein said first open end is adjacent the second side of said enclosure; wherein a first side of said four sides is opposite and distal from a second side of said four sides; wherein the last said first side includes two first slots and a first runner parallel to said first slots; wherein the last said second side includes two second slots and a second runner parallel to said second slots; wherein each of said interlocking members comprises a first side including two first pins and a first recess parallel to said first pins, and a second side including two second pins and a second recess parallel to said second pins; wherein said two first pins are structured to mate with said two first slots and said first recess is structured to mate with said first runner of one phase barrier member of said adjacent pair of said separate phase barrier members; and wherein said two second pins are structured to mate with said two second slots and said second recess is structured to mate with said second runner of the other phase barrier member of said adjacent pair of said separate phase barrier members.

2. The electrical switching apparatus of claim 1, wherein the pins are four tapered pins; wherein each of said four tapered pins includes a taper; wherein each of said number of interlocking members comprises a body including a first side, a second side opposite and distal from the last said first side, and four edges extending from the last said first side to the last said second side; wherein each of said four tapered pins defines a corresponding one of said four edges; and wherein each of said four edges includes a protrusion proximate the last said first side that forms at least part of the taper of a corresponding one of said four tapered pins.

3. The electrical switching apparatus of claim 2, wherein the slots are tapered, and wherein the slots of said first side of said each of said separate phase barrier members is two tapered slots and said number of tapered slots of said second side of said each of said separate phase barrier members is two tapered slots; and wherein each of said tapered slots of the last said first and second sides is resilient and is structured to flex in response to engagement with a corresponding one of said tapered pins.

* * * * *